US012807861B2

(12) United States Patent
Murcia et al.

(10) Patent No.: US 12,807,861 B2
(45) Date of Patent: Nov. 24, 2026

(54) NANOMODIFIED POLYMER WITH CEMENT HYDRATION-MATCHING POLYMERIZATION KINETICS TO MODIFY CEMENT FOR WELLBORE APPLICATIONS AND METHODS OF MAKIN

(71) Applicant: TS-NANO, Inc., Albuquerque, NM (US)

(72) Inventors: Daniel Heras Murcia, Albuquerque, NM (US); Usama Farid Kandil, Albuquerque, NM (US); John C. Stormont, Albuquerque, NM (US); Mahmoud Reda Taha, Albuquerque, NM (US)

(73) Assignee: TS-NANO, Inc., Albuquerque, NM (US)

( * ) Notice: Subject to any disclaimer, the term of this patent is extended or adjusted under 35 U.S.C. 154(b) by 0 days.

(21) Appl. No.: 19/479,463

(22) PCT Filed: Jul. 21, 2025

(86) PCT No.: PCT/US2025/038531

§ 371 (c)(1),
(2) Date: Oct. 28, 2025

(87) PCT Pub. No.: WO2026/020177

PCT Pub. Date: Jan. 22, 2026

(65) Prior Publication Data

US 2026/0132327 A1 May 14, 2026

Related U.S. Application Data

(60) Provisional application No. 63/673,619, filed on Jul. 19, 2024.

(51) Int. Cl.
*C09K 8/493* (2006.01)
*C04B 22/06* (2006.01)
(Continued)

(52) U.S. Cl.
CPC .............. *C09K 8/493* (2013.01); *C04B 22/06* (2013.01); *C04B 28/021* (2013.01); *C04B 28/04* (2013.01);
(Continued)

(58) Field of Classification Search
CPC ......... C09K 8/493; C04B 22/06; C04B 28/04; C04B 2201/50; E21B 43/26; E21B 43/16
See application file for complete search history.

(56) References Cited

U.S. PATENT DOCUMENTS 9,738,563 B1 8/2017 Bao et al.
2007/0026069 A1* 2/2007 Shastri .............. A61K 38/1858 977/906

(Continued)

OTHER PUBLICATIONS

U.S. Patent and Trademark Office; International Search Report & Written Opinion for PCT/US2025/038531; Sep. 16, 2025; 10 pages; Alexandria VA.

*Primary Examiner* — Silvana C Runyan
(74) *Attorney, Agent, or Firm* — Keith Vogt, Ltd.; Keith A. Vogt

(57) ABSTRACT

A nanomodified polyphenol-based-modified-cement with improved rheological, mechanical strength, eliminating shrinkage, reduced fluid loss, and enhanced durability and longevity for wellbore applications in the Oil & Gas industries, sub-surface storage facilities, geothermal energy systems and other fields, sub-surface storage facilities, geothermal energy systems and other fields.

1 Claim, 2 Drawing Sheets

(51) Int. Cl.

| | |
|---|---|
| ***C04B 28/02*** | (2006.01) |
| ***C04B 28/04*** | (2006.01) |
| ***C09K 8/42*** | (2006.01) |
| *E21B 43/26* | (2006.01) |

(52) U.S. Cl.

CPC ............ *C04B 2201/50* (2013.01); *C09K 8/42* (2013.01); *E21B 43/26* (2013.01)

(56) References Cited

U.S. PATENT DOCUMENTS

| | | | | |
|---|---|---|---|---|
| 2010/0273691 | A1 | 10/2010 | Roddy et al. | |
| 2012/0152540 | A1 | 6/2012 | Patil et al. | |
| 2013/0274149 | A1* | 10/2013 | Lafitte | C09K 8/74 507/112 |
| 2022/0048819 | A1* | 2/2022 | Shanmugam | C01B 33/18 |
| 2022/0306926 | A1 | 9/2022 | Boul et al. | |
| 2023/0257642 | A1* | 8/2023 | Boul | C04B 14/028 166/292 |

* cited by examiner

NANOMODIFIED POLYMER WITH CEMENT HYDRATION-MATCHING POLYMERIZATION KINETICS TO MODIFY CEMENT FOR WELLBORE APPLICATIONS AND METHODS OF MAKIN

RELATED APPLICATIONS

This application is a US 371 National Phase of PCT/US2025/038531, filed on 21 Jul. 2025, which claims priority to U.S. Provisional Application No. 63/673,619, filed on 19 Jul. 2024, both of which are incorporated herein in their entirety.

BACKGROUND OF THE INVENTION

Wellbore applications in the Oil & Gas industries, sub-surface storage facilities, geothermal energy systems and other fields, sub-surface storage facilities, geothermal energy systems and other fields. Gas migration during the cement transition time from liquid to solid often use concrete as a sealant to prevent the unwanted release of gasses and the like. However, before the concrete has had sufficient time to fully harden, the entrap gasses often permeate therein leading to degradation in the quality of the concrete. As described more fully below, the embodiments of the present invention provide solutions to prevent or reduce gas permeation.

BRIEF SUMMARY OF THE INVENTION

In one embodiment, the present invention provides a nanomodified polyphenol-based polymer that creates polymer nano to micro-inclusions distributed within and interwoven with the cement slurry such that these nano to micro-inclusions, improve cement slurry flowability, reduce cement slurry fluid loss, increase cement slurry surface tension, accelerate the cement slurry transition from fluid to solid to resist gas migration, eliminate cement slurry shrinkage, and once hardened, are well-bonded and interwoven into the cement microstructure to create a ductile nano-modified polymer cement with high bond strength to outer surfaces, low permeability and high durability for wellbore applications.

In another embodiment, the present invention provides a nanomodified polyphenol-based polymer that creates polymer nano to micro-inclusions distributed within the cement slurry such that these nano to micro-inclusions, improve cement slurry flowability, reduce cement slurry fluid loss, increase cement slurry surface tension, accelerate the cement slurry transition from fluid to solid to resist gas migration, eliminate cement slurry shrinkage, and once hardened, are well-bonded and interwoven into the cement microstructure to create a ductile nano-modified polymer cement with high bond strength to outer surfaces, low permeability and high durability for wellbore applications.

In one embodiment, the present invention provides a nanomodified polyphenol-based polymer that creates polymer nano to micro-inclusions distributed within the cement slurry such that these nano to micro-inclusions, once hardened, are well-bonded and interwoven into the cement microstructure to create a ductile nano-modified polymer cement for wellbore applications.

In one embodiment, the present invention provides a nanomodified polyphenol-based polymer that can work with all cement types, including ASTM Types I, II, III, IV, and V, and API oil well cements class A, B, C, G, H, L, and cement blends with biochar, fly ash, silica flour and all other pozzolanic materials.

In another embodiment, the present invention uses a nano-modified solvent to selectively control/engineer the gelation/hardening times and rates of the polyphenol polymer to change the polymerization kinetics to mimic that of cement hydration to match the material solidification rates, as well as the initial and final setting time of the specifically modified cement.

In another embodiment, the present invention uses a nano-modified polymer formulated to stay dormant until the cement slurry gelation starts.

In another embodiment, the present invention uses a nano-modified polymer formulated to be activated at a pre-determined temperature that is generated at the start of cement gelation.

In another embodiment, the present invention accelerates the cement slurry transition from liquid to solid to prevent gas migration by accelerating the polymerization rate once activated to generate exothermic heat that expedites the cement hydration, which in turn further expedites the polymerization such that a polymerization-hydration chain reaction takes place to accelerate the cement gelation and shorten the fluid to solid transition time of the cement slurry to prevent gas migration.

In another embodiment, the present invention uses a high-temperature solvent (e.g., nano-modified dimethyl sulfoxide) for high-temperature cementing applications.

In another embodiment, the present invention uses nano-modification of the polyphenol-based cement mixture to significantly improve the bond properties within the polymer-cement and of the nanomodified polymer-cement to all substrates, including steel, cement, and rock formations.

In another embodiment, the present invention provides a new class of polyphenol-based cement that offers superior ductility and significantly enhanced resistance to crack propagation compared with conventional oilwell cement.

In another embodiment, the present invention provides a new class of polyphenol-based cement that has a compressive strength and compressive strength gain rate comparable to or exceeding that of typical oil well cement.

In another embodiment, the present invention provides a new nanomodified polyphenol-based cement slurry with significant surface tension between its particles (cement slurry particles and polymer nano to micro-inclusions) to prevent gas migration during the cement transition time from liquid to solid.

In another embodiment, the present invention provides a new nanomodified polyphenol-based hardened cement class that has a very low permeability to fluids, including water, CO2, methane, and other liquids and gases.

In another embodiment, the present invention provides a new nanomodified polyphenol-based cement class that has improved durability and longevity in subsurface environments, including resistance to degradation by water, CO2, methane, acids, and other liquids and gases.

In another embodiment, the present invention provides a new nanomodified polyphenol-based cement class that has very low to no shrinkage compared with conventional oilwell cement.

In another embodiment, the present invention provides a new nanomodified polyphenol-based cement class that where no other typical cement additives are needed in the cement slurry.

In another embodiment, the present invention provides a new polymer-cement slurry for wellbore applications with bottomhole temperatures ranging from zero to 250° C. (30-480° F.).

It is to be understood that both the foregoing general description and the following detailed description are exemplary and explanatory only and are not restrictive of the invention, as claimed.

DETAILED DESCRIPTION OF THE INVENTION

Figures 1A, 1B:
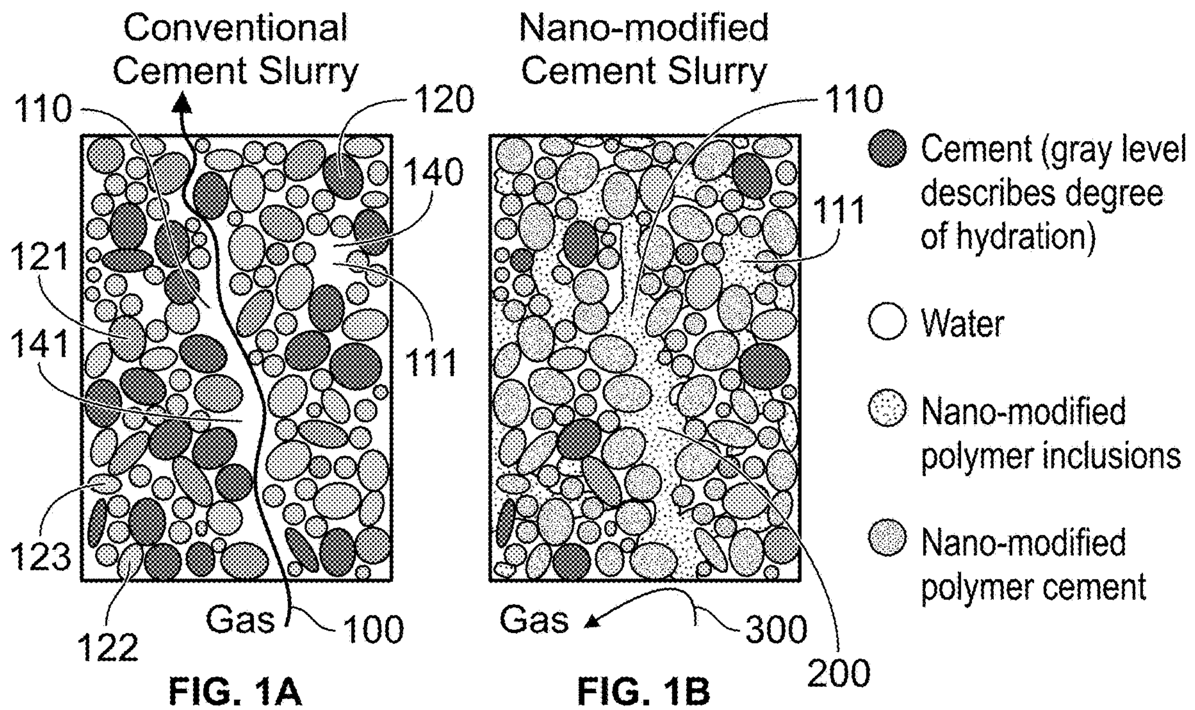
FIG. 1A illustrates how an entrapped gas or fluid may permeate a conventional cement slurry before forming concrete.
FIG. 1B illustrates how the embodiments of the present invention provide a cohesive co-evolution of the cement and polymer microstructure to create an interwoven polymer-cement state that has a low permeability for fluids and gasses with improved mechanical properties and minimal shrinkage.
Figure 2:
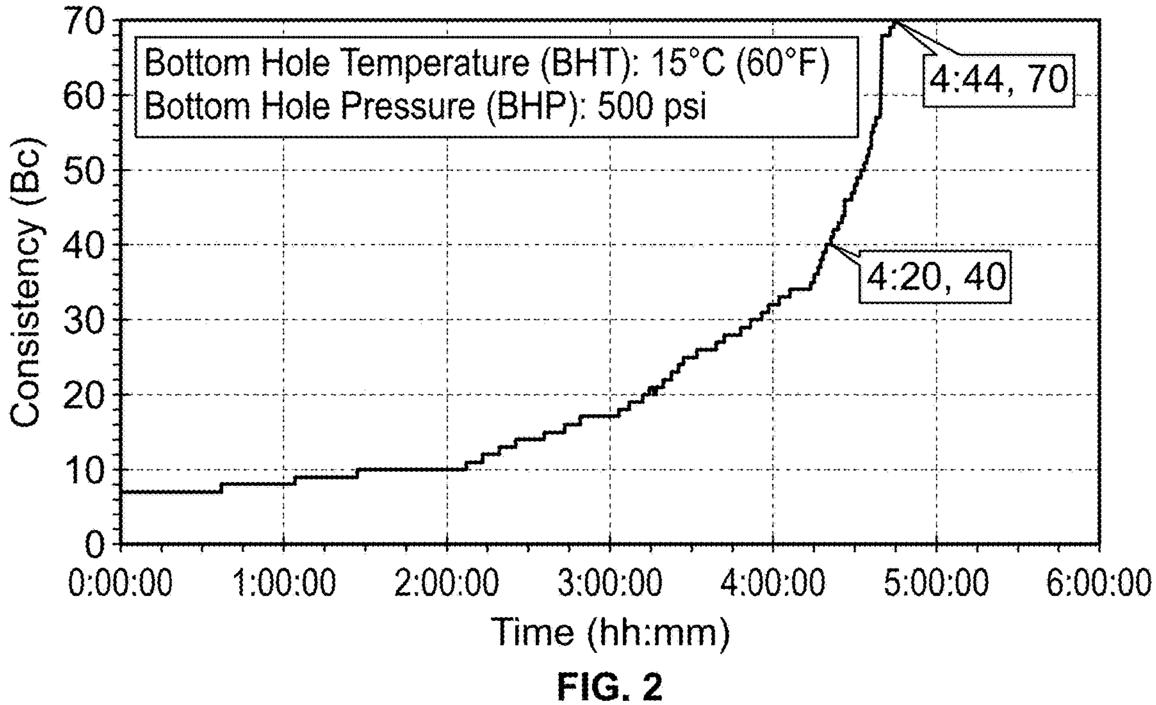
FIG. 2 is a consistency curve for nano-modified polymer-class G cement slurry tested at 15° C. (60° F.) and 500 psi to simulate downhole conditions (Example 1).
Figure 3:
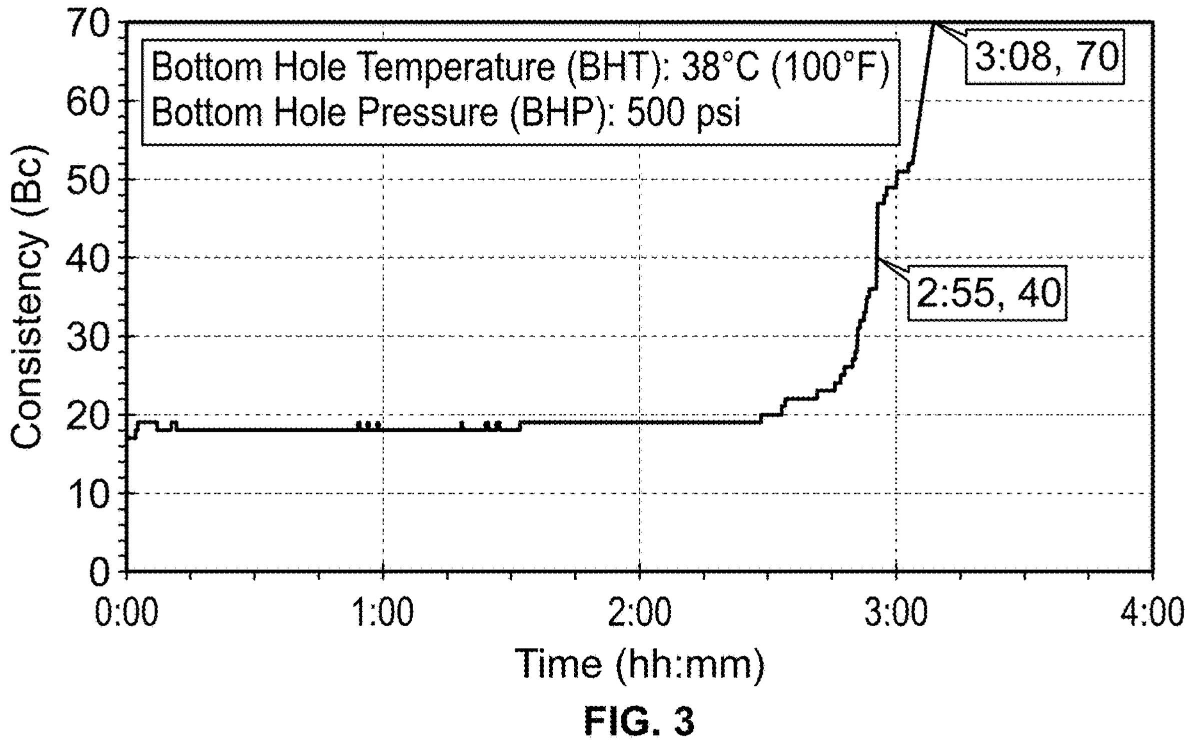
FIG. 3 is a consistency curve for nano-modified polymer-fly ash cement blend slurry tested at 38° C. (100° F.) and 500 psi to simulate downhole conditions (Example).
Figure 4:
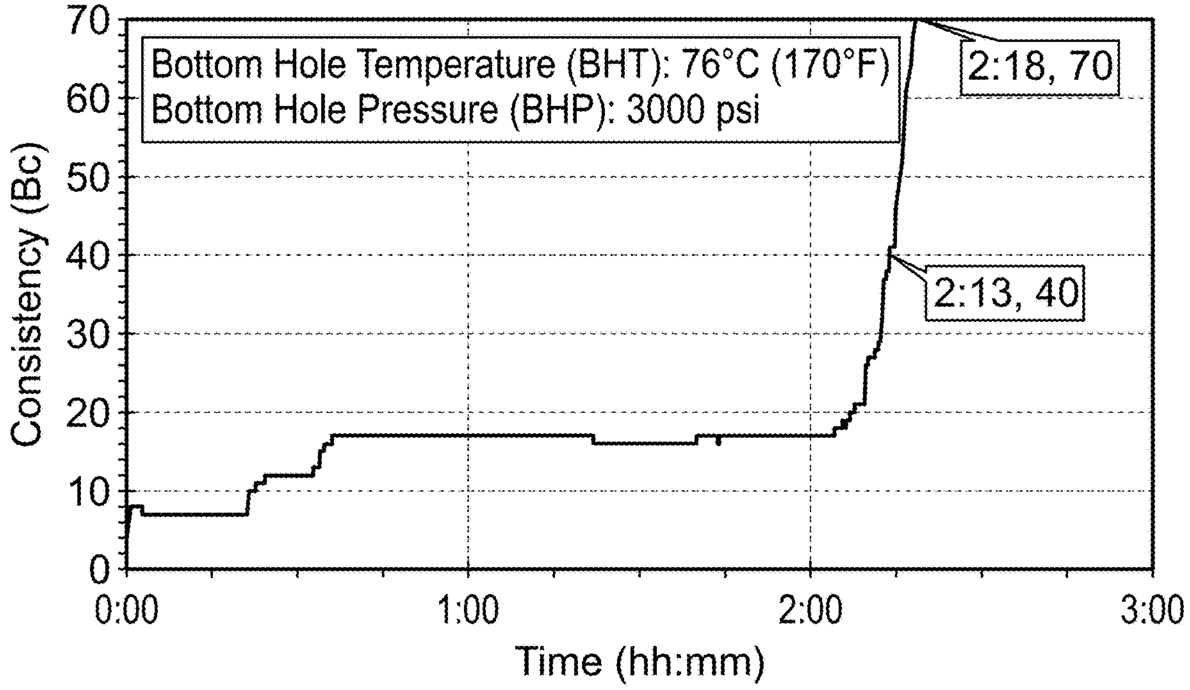
FIG. 4 is a consistency curve for nano-modified polymer-fly ash cement blend slurry tested at 76° C. (170° F.) and 3000 psi to simulate downhole conditions (Example 3).

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure, or system. Further, the terms and phrases used herein are not intended to be limiting, but rather to provide an understandable description of the invention.

In one embodiment, the present invention provides a nano-modified polyphenol-based cement, typically consisting of at least cement and water, further incorporating a nano-modified polyphenol-based polymer. This embodiment of the present invention has favorable characteristics compared with cement, such as excellent mechanical properties (compressive strength above 1500 psi after 24 h), comparable fluid density to normal cement slurry (12.00-17.0 ppg), and very similar rheological properties to cement slurry used for wellbore applications.

Definitions

Nano-modified polymer inclusions refer to nano and micro droplets formed by dispersing the polymer into the cement-water slurry due to the hydrophobicity of the nano-modified polymer.

Dispersion refers to the process where particles, either solid, liquid, or gas, are distributed throughout a liquid medium, creating a heterogeneous mixture.

Polymer-cement slurry is a composite material used in wellbore and other applications, consisting of cement, water, and a polymer additive.

Surface tension is a property of liquids that causes their surface to behave like an elastic film.

Surface functionalization refers to the process of modifying the surface of a material—typically at the molecular or nanoscale level—to introduce specific chemical groups, functional molecules to alter its surface properties such as wettability, charge, reactivity, or compatibility.

Gas migration refers to the movement of gas through geological formations or wellbores, often driven by pressure differences.

Cement gelation refers to the initial stiffening or setting of cement slurry, This process involves a rapid increase in viscosity, potentially making the slurry unpumpable.

Cement slurry fluid loss refers to the process where the liquid portion of a cement slurry (filtrate) leaks off into a permeable formation or gap, leaving behind a filter cake. This is a factor in well construction, especially when dealing with gas migration risks, tight restrictions, or when high-performance slurries are needed.

Cement hydration is a chemical reaction between cement and water that results in the hardening of concrete. This process is for concrete's strength and durability as it involves the formation of new compounds that bind the aggregate together.

Free water: In cement slurries, free water refers to the excess water that separates from the cement and additives after mixing, forming a layer on top. This free water is not chemically bound to the cement particles for hydration and can lead to issues like reduced zonal isolation and gas migration in oil and gas wells. Controlling free water is essential for ensuring the integrity of cement jobs, especially in deviated or horizontal wells.

Cement water retention refers to the ability of cement-based materials to hold onto water, which is crucial for proper hydration and strength development. Water loss can lead to premature hardening and reduced strength, especially when in contact with porous materials.

Shrinkage of the nano-modified polymer-cement slurry is a concern in cementitious materials due to reduction of volume associated with solidification, potentially leading to debonding and or cracks the compromising the wellbore integrity of.

Latent heat source refers to the heat released during a delayed chemical change of a substance.

Electrical repulsion of the nanoparticles refers to the force that pushes them apart when they carry the same type of electrical charge (both positive or both negative). This phenomenon is based on the fundamental principle that like charges repel each other.

Cement slurry flowability, also known as rheology, is that dictates how easily it can be pumped and placed, and is influenced by factors like the water-to-cement ratio and additives. Controlling flowability impacts strength development, stability, and overall performance of the concrete.

FIG. 1A illustrates how an entrapped gas 100 may permeate a conventional cement slurry before forming concrete. As shown, gas or fluid 100 is able to permeate through pathways or voids 110-111 created by cement materials 120-122 which are dispersed in water 140-141.

FIG. 1B illustrates how the embodiments of the present invention provide a cohesive co-evolution of cement and polymer microstructure to create an interwoven polymer-cement state that has a low permeability for fluids and gasses with improved mechanical properties and minimal shrinkage. As shown, voids 110 and 111 are filled by a nano-modified polymer-cement slurry 200 which prevents or reduces the permeation of gas 300 into the mixture.

In another embodiment, the present invention concerns multi-surface functionalized nanoparticles using multi-surface functional groups. The surface functional groups are developed using covalent or non-covalent surface functionalization methods. The nanoparticles to be used include, but are not limited to, carbon nanotubes, graphene nanoplatelets, alumina nanoparticles, titanium oxide nanoparticles, ferrite nanoparticles, zinc oxide nanoparticles, silica nanoparticles, magnesium nanoparticles, calcium aluminate nanoparticles, nanocellulose, and clay nanoparticles.

The nanomodification of the polymer and the use of high-temperature solvents control the polymerization time to match the hydration kinetics of cement. Matching cement hydration and polymer polymerization kinetics (reaction sequence and time) is achieved by keeping the polymerization process in a deactivated state and then changing the polymerization process to an activated state when cement hydration starts. This allows a cohesive co-evolution of the cement and polymer microstructure to create an interwoven polymer-cement state that has a low permeability for fluids with improved mechanical properties and zero shrinkage.

The above process aims at setting polymerization into a dormant mode such that polymerization is activated when the cement hydration starts. This is achieved using a latent hardener (e.g., dicyandiamide (DICY)) with a pre-determined concentration that is only activated at high temperature reachable through the start of cement hydration. The polymerization process is triggered when the exothermic cement hydration reaction starts and the slurry reaches a specific predetermined temperature. This process allows for creating a hydration-polymerization chain reaction that accelerates the cement solidification, shortens the cement fluid-solid transition time to prevent gas migration.

The above process depends on the nanomodification process, so the polymerization-hydration kinetics can be controlled.

The above nanomodification process is achieved using multi-surface-functionalized nanoparticles. The multi-surface-functionalization is chosen to accomplish the multi-requirements of the nano-modified polymer cement slurry in wellbore applications.

A first surface functionalization adapted to improve the dispersion of all the nanoparticles of the polymer-cement slurry. This surface functionalization is achieved by using (3-Glycidyloxypropyl) trimethoxysilane to improve the dispersion of all the nanoparticles of the polymer-cement slurry.

The second surface functionalization increases the surface tension of the polymer-cement slurry to prevent gas migration. This is achieved using aminopropyl-triethoxysilane surface functionalized silica nanoparticles, magnesium nanoparticles, and/or cellulose nanoparticles.

The third surface functionalization controls the cement gelation time by interfering with the cement hydration reaction using phosphonic surface functionalized zinc oxide nanoparticles and/or calcium aluminate nanoparticles.

The fourth surface functionalization limits the cement slurry fluid loss and free water by improving water retention of the nano-modified polymer-cement slurry. This is achieved using carboxylic-functionalized cellulose nanoparticles and/or ferrite nanoparticles.

The fifth surface functionalization reduces the shrinkage of the nano-modified polymer-cement slurry using silane-functionalized silica nanoparticles, and/or magnesium-oxide nanoparticles.

The sixth surface functionalization provides an external latent heat source that is activated at a predetermined time to initiate the cement gelation when desired. This is achieved using triethanolamine surface functionalized titanium oxide nanoparticles, silica nanoparticles, ferrite oxide nanoparticles, and/or magnesium-oxide nanoparticles.

The seventh surface functionalization is performed using methacrylic acid esters-DMSO dissolved compound to surface functionalize alumina nanoparticles, titanium oxide nanoparticles, cellulose nanoparticles, ferrite nanoparticles, magnesium nanoparticles, and/or zinc oxide nanoparticles. The above surface functionalization provides electrical repulsion of the nanoparticles in the polymer-cement slurry to maintain high flowability.

The eighth surface functionalization improves the bonding of the nanomodified polymer with the cement and of the nano-modified-polymer-cement with steel or rock formations using polyacrylate and/or methyl methacrylate grafted surface functionalized of alumina nanoparticles, carbon nanotubes, graphene nanoparticles and/or clay nanoparticles.

The nanomodified polymer is added in a liquid or powder form to the water and cement mix before mixing and mixed in a conventional method.

The nanomodified polymer cement slurry has a similar thickening time (according to API RP 10B-2, Clause 9) to a regular cement-based mix without modification.

In one preferred embodiment, the present invention provides a nanomodified polyphenol-based modified cement wherein the mixture includes the nanomodified polyphenol to cement with a mixing ratio below 12 parts of cement to 1 part of the nanomodified polymer by weight.

Working Example 1

Class G cement slurry with a density of 1900 kg/m3 (15.9 ppg) suffers from a slow liquid-to-solid transition time (about 2 hours) when used at a relatively low bottomhole temperature (BTH), 15° C. (60° F.). Such a slow transition allows significant gas migration. To overcome this limitation, the Class G cement slurry is mixed with the nano-modified polymer, with the surface functionalization described above, in a weight ratio of 6.9 Cement:2.8 Water: 1.0 Nano-modified polymer. The mix shows an operation time of 4:20 HR:MN (which can be controlled to meet operation requirements) and a short transition time between 40-70 Bc of 24 minutes. The mix has excellent cement slurry characteristics as presented below and remarkable resistance to gas migration.

| Characteristic of Example 1 | Nano-modified polymer-class G cement slurry at 15° C. (60° F.) BHT |
|---|---|
| Thickening Time (Below 40 Bc) | 4:20 HR:MN |
| Transition time (40-70 Bc) | 24 minutes |
| Compressive strength - psi (24 h) | 1600 |
| Shear bond strength with steel casing - psi (24 h) | 500 |
| 10 Min - Static gel strength | 40 |
| Fluid loss (mL) | 46 |

-continued

| Characteristic of Example 1 | Nano-modified polymer-class G cement slurry at 15° C. (60° F.) BHT |
|---|---|
| Free fluid % | 0.00 |
| Shrinkage strain % | 0.00 |
| Permeability | << 1 millidarcy |

Working Example 2

A cement slurry blend including fly ash with a density of 1700 kg/m3 (14.2 ppg) suffers from a very slow liquid-to-solid transition time when used at a moderate bottomhole temperature, 38° C. (100° F.). Such a slow transition allows significant gas migration. To overcome this limitation, the fly ash cement blend slurry is mixed with the nano-modified polymer, with the surface functionalization described above in a weight ratio of 6.7 Cement:3.1 Water:1.0 Nano-modified polymer. The mix shows an operation time of 2:55 HR:MN (which can be controlled to meet operation requirements) and a short transition time between 40-70 Bc of 13 minutes. The mix has excellent cement slurry characteristics as presented below and remarkable resistance to gas migration.

| Characteristic of Example 2 | Nano-modified polymer-fly ash cement blend slurry at 37° C. (100° F.) BHT |
|---|---|
| Thickening Time (Below 40 Bc) | 2:55 HR:MN |
| Transition time (40-70 Bc) | 13 minutes |
| Compressive strength - psi (24 h) | 1700 |
| Shear bond strength with steel casing - psi (24 h) | 480 |
| 10 Min - Static gel strength | 50 |
| Fluid loss (mL) | 44 |
| Free fluid % | 0.00 |
| Shrinkage strain % | 0.00 |
| Permeability | << 1 millidarcy |

Working Example 3

A cement slurry blend including Class C cement with a density of 1700 kg/m3 (14.2 ppg) suffers from the inability to resist a significant gas migration when used for P&A of a well with a bottomhole temperature of 77° C. (170° F.). To overcome this limitation, the class C cement blend slurry is mixed with the nano-modified polymer, with the surface functionalization described above, in a weight ratio of 9.4 Cement:5.7 Water:1.0 Nano-modified polymer. The mix shows an operation time of 2:55 HR:MN (which can be controlled to meet operation requirements) and a short transition time between 40-70 Bc of 2 minutes. The mix has excellent cement slurry characteristics as presented below and remarkable resistance to gas migration.

| Characteristic of Example 3 | Nano-modified polymer-class C cement blend slurry at 76° C. (170° F.) BHT |
|---|---|
| Thickening Time (Below 40 Bc) | 2:13 HR:MN |
| Transition time (40-70 Bc) | 5 minutes |
| Compressive strength - psi (24 h) | 1700 |
| Shear bond strength with steel casing - psi (24 h) | 500 |
| 10 Min - Static gel strength | 30 |
| Fluid loss (mL) | 50 |
| Free fluid % | 0.00 |
| Shrinkage strain % | 0.00 |
| Permeability | << 1 millidarcy |

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should, therefore, not be limited by the above-described embodiments, methods, and examples but by all embodiments and methods within the scope and spirit of the disclosure.

What is claimed is:

1. A nano-modified polymer cement slurry that mimics the hydration kinetics of cement while preventing gas migration through cement comprising:

cement;

a polymer mixed with said cement to form a polymer-cement slurry;

said polymer comprising:

(1) 3-Glycidyloxypropyltrimethoxysilane-surface functionalized silica nanoparticles adapted to improve the dispersion of said nanoparticles in said polymer-cement slurry;

(2) aminopropyl-triethoxysilane-surface functionalized cellulose nanoparticles adapted to increase the surface tension of said polymer-cement slurry to prevent gas migration;

(3) phosphonic-surface functionalized zinc oxide nanoparticles adapted to control the gelation time of said polymer-cement slurry by interfering with the cement hydration reaction;

(4) phosphonic-surface functionalized calcium aluminate nanoparticles adapted to control the gelation time of said polymer-cement slurry by interfering with the cement hydration reaction;

(5) carboxylic-surface functionalized ferrite nanoparticles adapted to limit water loss by improving water retention of said polymer-cement slurry;

(6) silane-surface functionalized magnesium-oxide nanoparticles adapted to reduce the shrinkage of said polymer-cement slurry;

(7) triethanolamine-surface functionalized magnesium-oxide nanoparticles adapted to provide an external latent heat source that is activated at a predetermined time to initiate gelation of said polymer-cement slurry;

(8) methacrylic acid esters-DMSO-surface functionalized alumina nanoparticles adapted to provide electrical repulsion of said nanoparticles in said polymer-cement slurry to maintain flowability;

(9) polyacrylate-surface functionalized carbon nanotubes adapted to improve the bonding of said polymer with said cement; and

(10) methyl methacrylate-surface functionalized clay nanoparticles adapted to improve the bonding of said polymer with said cement.

* * * * *